(12) United States Patent
Byron et al.

(10) Patent No.: US 11,138,506 B2
(45) Date of Patent: Oct. 5, 2021

(54) ABSTRACTION AND PORTABILITY TO INTENT RECOGNITION

(71) Applicant: INTERNATIONAL BUSINESS MACHINES CORPORATION, Armonk, NY (US)

(72) Inventors: Donna K. Byron, Petersham, MA (US); Benjamin L. Johnson, Baltimore City, MD (US); Ladislav Kunc, Prague (CZ); Mary D. Swift, Rochester, NY (US)

(73) Assignee: International Business Machines Corporation, Armonk, NY (US)

(*) Notice: Subject to any disclaimer, the term of this patent is extended or adjusted under 35 U.S.C. 154(b) by 777 days.

(21) Appl. No.: 15/728,962

(22) Filed: Oct. 10, 2017

(65) Prior Publication Data

US 2019/0108450 A1    Apr. 11, 2019

(51) Int. Cl.
*G06N 5/02* (2006.01)
*G06F 16/33* (2019.01)
*G06F 40/30* (2020.01)
*G06F 40/247* (2020.01)
*G06F 40/284* (2020.01)

(52) U.S. Cl.
CPC ........... *G06N 5/02* (2013.01); *G06F 16/3344* (2019.01); *G06F 40/247* (2020.01); *G06F 40/284* (2020.01); *G06F 40/30* (2020.01)

(58) Field of Classification Search
CPC ..................................................... G06N 5/02
See application file for complete search history.

(56) References Cited

U.S. PATENT DOCUMENTS

| 6,314,399 | B1 | 11/2001 | Deligne et al. |
| 7,031,908 | B1 | 4/2006 | Huang et al. |
| 7,085,723 | B2 | 8/2006 | Ross et al. |
| 7,912,702 | B2 | 3/2011 | Bennett |
| 2005/0289522 | A1 | 12/2005 | Chang et al. |
| 2007/0239444 | A1 | 10/2007 | Ma |
| 2010/0275179 | A1 | 10/2010 | Menguosoglu et al. |
| 2014/0079202 | A1 | 3/2014 | Movshovich et al. |

(Continued)

FOREIGN PATENT DOCUMENTS

| CN | 1716192 A | 1/2006 |
| CN | 101872341 A | 10/2010 |
| WO | 03001781 A1 | 1/2003 |

(Continued)

OTHER PUBLICATIONS

Andersen, Improving End-to-End Availability Using Overlay Networks, Doctoral Thesis, Massachusetts Institute of Technology, 2005, pp. 1-150 (Year: 2005).*

(Continued)

*Primary Examiner* — Wilbert L Starks
(74) *Attorney, Agent, or Firm* — Conley Rose, P.C.

(57) ABSTRACT

A computer-implemented method for building a semantic analysis model. In one embodiment, the computer-implemented method includes creating proxy tags comprising a set of surface form variants. The computer-implemented method creates training examples comprising a combination of terminal tokens and at least one of the proxy tags. The computer-implemented method builds the semantic analysis model using the training examples.

25 Claims, 5 Drawing Sheets

(56) References Cited

U.S. PATENT DOCUMENTS

2014/0351228 A1    11/2014   Kosuke

FOREIGN PATENT DOCUMENTS

WO        2007069512 A1    6/2007
WO        2013080406 A1    4/2015

OTHER PUBLICATIONS

Dunietz, et al., Automatically Tagging Constructions of Causation and Their Slot-Fillers, Transactions of the Association for Computational Linguistics 2017, vol. 5, 2017, pp. 117-133 (Year: 2017).*

Foreign Communication From a Counterpart Application, PCT Application No. PCT/IB2018/057745, English Translation of International Search Report dated Jan. 30, 2019, 5 pages.

Foreign Communication From a Counterpart Application, PCT Application No. PCT/IB2018/057745, English Translation of Written Opinion dated Jan. 30, 2019, 4 pages.

Mansuy, et al., "Evaluating WordNet Features in Text Classification Models," American Associate for Artifical Intelligence (www.aaai.org), downloaded from the internet: http://dl.acm.org/citation.cfm?Id=1072315 https://www.aaai.org/Papers/FLAIRS/2006/Flairs06-112.pdf, 2006, pp. 568-573.

Foreign Communication from counterpart application, Japanese patent application No. 2020-518686, dated Aug. 19, 2021, 4 pages.

* cited by examiner

ABSTRACTION AND PORTABILITY TO INTENT RECOGNITION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The present disclosure relates generally to language modeling that may be used in natural language processing systems or conversational agent systems. Natural language processing is a field that covers computer understanding and manipulation of human language. The use of natural language processing has grown in recent years as more applications are interacting with users using voice dialogue.

Traditional approaches to language modelling have relied on a fixed corpus of text to provide training samples in determining a probability distribution over word sequences. Increasing the corpus size often leads to better-performing language models. However, achieving the quantity of valid training examples to reliably train a classifier is challenging because the process is overly fitted to lexical features (i.e., surface form) that require every alternative phrasing of a sentence or question be explicitly provided in the training example set.

SUMMARY

The disclosed embodiments include a natural language processing system, a computer program product, and various computer-implemented methods for building a semantic analysis model and applying the model to process natural language inputs. As an example embodiment, a computer-implemented method is disclosed that includes the step of creating proxy tags comprising a set of surface form variants. The computer-implemented method creates training examples comprising a combination of terminal tokens and proxy tags. The computer-implemented method builds the semantic analysis model using the training examples.

As another example embodiment, a computer-implemented method for building and testing models for semantic analysis of natural language is disclosed that includes the step of creating proxy tags that have a set of surface form variants. The computer-implemented method creates training examples that include a combination of terminal tokens and at least one of the proxy tags. The computer-implemented method performs feature extraction using the training examples to extract features of the training examples. The computer-implemented method builds a semantic analysis model that uses the features of the training examples as input data.

As another example embodiment, a computer-implemented method is disclosed that includes the step of creating proxy tags comprising a set of surface form variants. The computer-implemented method creates training examples comprising one or more proxy tags. The computer-implemented method builds the semantic analysis model using the training examples.

One optional feature of various embodiments is that the set of surface form variants includes surface form variants that are phrases (e.g., "are they", "is it", "is that", etc.). In certain embodiments, the surface form variants may have inconsistent structural classes. For example, surface form variants for one proxy tag may include individual nouns, noun phrases, and question words plus noun phrases. In some embodiments, proxy tags may be made up of other proxy tags. In some embodiments, the surface form variants for a proxy tag may be auto-populated using various resources including, but not limited to, documents, knowledge graphs, thesauri, dictionaries, and a lexical database. Various embodiments may also include special handling for input language test instances to infer proxy features from surface form elements.

The disclosed embodiments provide a solution to the problem in the current supervised machine learning paradigm where training instances are naturally occurring language examples with no provided method for noting generalities that should be treated similarly by language classification or other probabilistic inference processes. Additionally, the disclosed embodiments provide several advantages over the current training paradigm including enabling faster training of the semantic analysis model because the exact phrases are not required to be created or listed. Another advantage is that the disclosed embodiments enable training examples to be broken up into modular/swappable pieces, with no grammatical rules required to represent substitutability.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
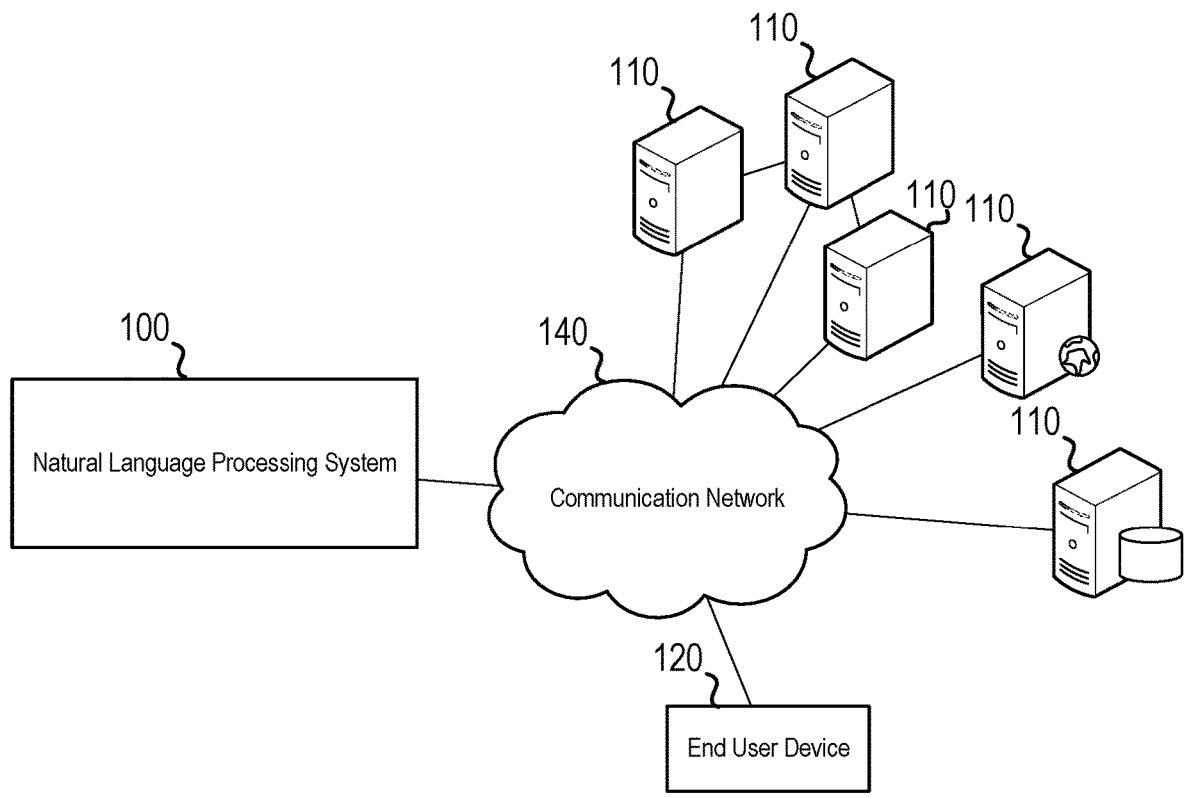
FIG. 1 is a schematic network diagram of a natural language processing system in accordance with various embodiments.

The illustrated figures are only exemplary and are not intended to assert or imply any limitation with regard to the environment, architecture, design, or process in which different embodiments may be implemented. Any optional component or steps are indicated using dash lines in the illustrated figures.

DETAILED DESCRIPTION

The disclosed embodiments seek to improve the process of developing language models that may be used in natural language processing systems or conversational agent systems. For instance, the disclosed embodiments include various systems and methods for utilizing term or phrasal proxies or proxy tags within training examples for building a semantic analysis model. The disclosed embodiments provide a solution to the problem in the current training paradigm where all possible surface forms must be listed in the training examples.

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

Current art for creating natural language understanding using supervised learning faces many challenges. Rather than relying on developers building modular language resources such as a lexicon and grammar, training examples are listed as naturally-occurring word sequences that are labeled with a desired output, such as an intent classification or sentiment tag. This method works well at scale but is problematic for bootstrapping some language understanding processes, such as for a new conversational agent working in a closed domain where a large volume of attested natural language examples are not available for system developers to train from. The hand-generated training examples that are produced in such scenarios often manifest repetition of phrasing in order to exhaustively list the elements of a semantic category, such as variations of verb choice or proper names.

This creates two distinct challenges to the performance of such language understanding systems. First is that the training examples, because they embed very specific words such as proper names, are not portable across deployments. Subsequent language understanding deployments, even if they are for a similar conversational domain, cannot make optimal use of the training samples created for a previous product. Secondly, artificial repetition of training example phrasing that was created in order to capture variants of one parameter (such as a product name) can cause a statistical bias within the language model features extracted from the training samples.

For example, using current art, training instances of a question whether a particular car is available in a hybrid model may be listed as below. In order for each model name to be included in the n-gram features produced by training, an example is provided for each model name, whereas what the content developer is actually attempting to do is demonstrate that the question template "Is there a hybrid version of X' where X is any car model, is a valid instance of this category.

Is there a hybrid version of RAV4?
Is there a hybrid version of Yaris?
Is there a hybrid version of Tundra?
Is there a hybrid version of Tacoma?
Is there a hybrid version of Sienna?
Is there a hybrid version of Sequoia?
Is there a hybrid version of Mirai?
Is there a hybrid version of Land Cruiser?
Is there a hybrid version of Corolla?
Is there a hybrid version of Camry?
Is Yaris available in a hybrid model?
Is Tundra available in a hybrid model?
Is Tacoma available in a hybrid model?
Is Sienna available in a hybrid model?
Is Sequoia available in a hybrid model?
Is RAV4 available in a hybrid model?
Is Mirai available in a hybrid model?
Is Land Cruiser available in a hybrid model?
Is Highlander available in a hybrid model?
Is Corolla available in a hybrid model?
Is Camry a hybrid?
Is RAV4 a hybrid?
Is Toyota RAV4 a hybrid?

There are numerous other questions that may be included in the above list.

As shown above, a technical problem with the current training paradigm is that building of the training examples for the language model is a tedious task because there are countless variations of sentences/questions that may be received as input, and substitutability of equivalent word classes is learned via explicit examples. Accordingly, the disclosed embodiments include various systems and methods that provide a technical solution to the current training paradigm by utilizing term or phrasal proxies or proxy tags within training examples for building a semantic analysis model. As an example, in accordance with various embodiments, the above training set may be captured as "Is @modelname a hybrid" accompanied by proxy set: @modelname={Rav4, Sienna, Camry . . . }. In certain embodiments, the proxy tags capture surface form lexical variation with any arbitrary internal grammatical/constituency structure. For instance, in some embodiments, variants for one proxy tag can shift from individual nouns to noun phrases to question words plus noun phrases, with no requirement that the internal details form a valid grammatical category. The disclosed embodiments provide a solution to the problem in the current training paradigm where all combinations of surface forms must be listed in the training examples. Additionally, in certain embodiments, the disclosed proxy tags surface form examples may be used across various training example sets. For example, in one embodiment, patterns in question words and predicate synonym sets can be listed as a set of surface form variants represented with a proxy tag and copied from one deployment to another. Where the full sentence training examples themselves, such as those shown above, may not be relevant to a different conversational training set, the proxy sets can contain isolated lexical content that is more portable across conversations.

FIG. 1 is a network diagram of a natural language processing system 100 in accordance with various embodiments. In the depicted embodiment, the natural language processing system 100 is communicatively coupled over a communication network 140 to various other systems 110. The systems 110 may include systems that store a corpus of training example sentences or a lexical database (e.g., WordNet®) that may be used by the natural language processing system 100 in building a semantic analysis model. The systems 110 may include systems that interact with the natural language processing system 100 in creating or testing a semantic analysis model (e.g., remote programmer or developer systems). The natural language processing system 100 may also be communicatively coupled to at least one end user device 120. The end user device 120 may be any type of electronic device that includes one or more applications that receives natural language input from a user. For example, the end user device 120 may be a smart phone with the built-in cognitive agent that communicates with a user via a verbal dialogue. Although the natural language processing system 100 is depicted as a separate and remote system from the end user device 120, in various embodiments, the natural language processing system 100 may be integrated as part of the end user device 120 or as part of another system.

As referenced above and herein, the term "communicatively coupled" means capable of sending and/or receiving data over a communication link. In certain embodiments, communication links may also encompass internal communication between various components of a system and/or with an external input/output device such as a keyboard or display device. Additionally, the communication link may include both wired and wireless links, and may be a direct link or may comprise multiple links passing through one or more network devices such as, but not limited to, routers, firewalls, servers, and switches. The network device may be located on various types of networks.

Unless specifically indicated, any reference to the processing, retrieving, and storage of data and computer executable instructions may be performed locally on an electronic device and/or may be performed on a remote network device. For example, data may be retrieved or stored on a data storage component of a local device and/or may be retrieved or stored on a remote database or other data storage systems.

A network, such as network 140, as used herein means a system of electronic devices that are joined together via communication links to enable the exchanging of information and/or the sharing of resources. Non-limiting examples of networks include local-area networks (LANs), wide-area networks (WANs), and metropolitan-area networks (MANs). The networks may include one or more private networks and/or public networks such as the Internet. The networks may employ any type of communication standards and/or protocol.

Figure 2:
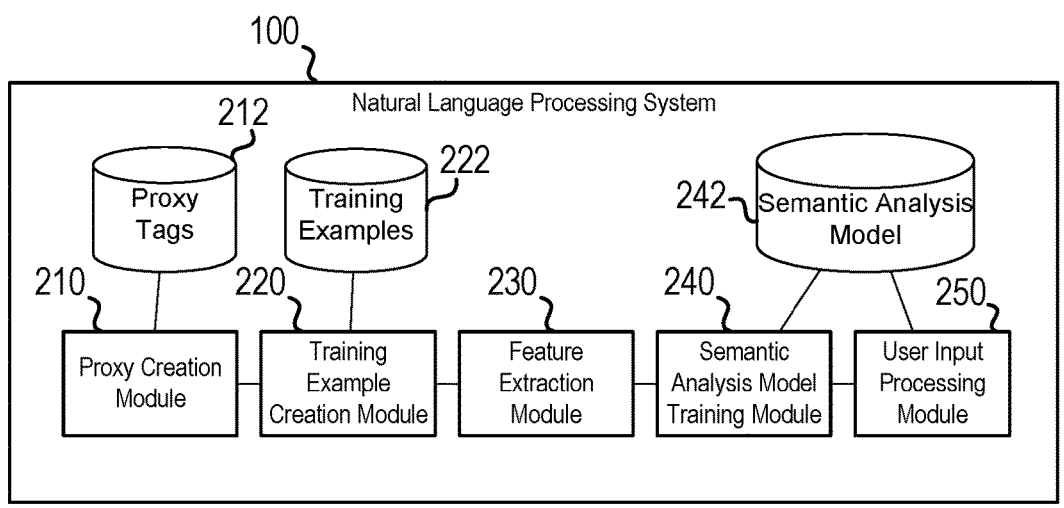
FIG. 2 is a schematic diagram of a natural language processing system in accordance with various embodiments.

FIG. 2 is a schematic diagram of a natural language processing system 100 in accordance with various embodiments. In the depicted embodiment, the natural language processing system 100 includes a proxy creation module 210, a training example creation module 220, a feature extraction module 230, a semantic analysis model training module 240, and a user input processing module 250.

A module as referenced herein may comprise of software components, hardware components, and/or a combination thereof. The software components may include, but is not limited to, data access objects, service components, user interface components, application programming interface (API) components, and other computer executable instructions. The hardware components may include, but is not limited to, electrical circuitry, one or more processors, and one or data storage components such as memory. The memory may be volatile memory or non-volatile memory that stores data and computer executable instructions. The computer executable instructions may be in any form including, but not limited to, machine code, assembly code, and high-level programming code written in any programming language. The module may be configured to use the data to execute one or more instructions to perform one or more tasks.

In one embodiment, the proxy creation module 210 is configured to enable the creation of proxy tags. A proxy tag as referenced herein is an identifier that contains a set of surface form lexical variations. In certain embodiments, the identifier may have a name, label, and/or identification number corresponding to the set of surface form lexical variations. In certain embodiments, the proxy tag may be preceded by, end with, or include at least one symbol to indicate that it is a proxy tag. For example, in one embodiment, the @ symbol may precede a named identifier to indicate that it is a proxy tag. As non-limiting examples, @colors may be a proxy tag that contains a set of various colors, or @citiesInTexas may contain a set of names of cities in Texas. In various embodiments, the proxy tags may be phrasal proxy tags that have a set of surface form lexical variations that includes phrases. For example, @howMany may be a phrasal proxy tag that has a set of surface form lexical variations such as {the number of, number of, how many, the amount of, amount of, the total number of, total number of}. In certain embodiments, the proxy tags capture surface form lexical variation with any arbitrary internal grammatical/constituency structure. For example, in various embodiments, the surface form lexical variations may include misspellings of the surface form lexical variations or homonyms to enable fuzzy/inexact matching. In various embodiments, the surface form variants may have inconsistent structural classes. For example, in certain embodiments, variants for one proxy tag can shift from individual nouns to noun phrases to question words plus noun phrases, with no requirement that the internal details form a valid grammatical category.

In various embodiments, the proxy tags and corresponding set of surface form lexical variations may be created and populated by receiving input from a user. In some embodiments, the creation of the proxy tags and the corresponding set of surface form lexical variations may be automated. For example, in certain embodiments, the proxy creation module 210 may automatically create proxy tags and the corresponding set of surface form lexical variations based on information gathered from glossaries, knowledge graphs or knowledge base, through term discovery within a document collection, and from a lexical database such as WordNet® or other resources for synonym, or by an automatic extraction of repeating word sequences that are present in raw training samples of a corpus. In one embodiment, once the proxy tags are created, the proxy tags may be stored locally or remotely in a proxy tags database 212. In some embodiments, the natural language processing system 100 may acquire previously created proxy tags from one or sources for use in the training examples disclosed herein.

In one embodiment, the training example creation module 220 is configured to enable the creation of training examples using the proxy tags. In some embodiments, the training examples may consist of any combination of proxy tags and surface form terminal tokens (e.g., ordinary words, punctuation marks, etc.). A terminal token is the smallest meaningful unit of a statement and can consist of 1 or more characters. Examples of terminal tokens include, but are not limited to, names, words, numbers, labels, operator symbols (e.g., +, =, =>, :, ::, ;, %), comma, and delimiters. In various embodiments, the terminal tokens in a training example may include words that are included as surface form variants in a proxy tag. For instance, when a particular training example is only valid for some but not all instances of a proxy set, e.g.

when only certain car models may have certain features (e.g., "Does the RAV4 come with off-road tires?").

In one embodiment, a user may manually create/write training examples. As an example, the user may create a training example that says "@howMany @Presidents were @occupation?" The @howMany proxy tag may include the set of surface form lexical variations as described above. The @Presidents proxy tag may include a set of surface form lexical variations that includes {U.S. Presidents, Presidents, and Presidents of the United States}. The @occupation proxy tag may include a set of surface form lexical variations that includes {lawyers, doctors, actors, farmers, Senators, and Congressman}. As shown, one training example in accordance with the disclosed embodiments may provide countless variations of examples for building a semantic analysis model. In certain embodiments, the training examples do not have to form a complete sentence, may include only proxy tags (i.e., no terminal tokens), or may be in a grammatically incorrect sequence. For example, in some embodiments, the natural language processing system 100 may be configured to produce the same examples for building a semantic analysis model using training examples "@howMany @Presidents @occupation" or "@howMany @occupation @Presidents" as it would have using training example "@howMany @Presidents were @occupation?" Similar to the creation of proxy tags, in some embodiments, a user may interact with a user interface or an application for creating training examples. Additionally, in some embodiments, the training examples may be automatically generated based on a corpus of sentences and/or documents. In one embodiment, once the training examples are created, the training examples may be stored locally or remotely in a training examples database 222.

In one embodiment, the feature extraction module 230 includes instructions for processing the disclosed training examples and extracting the features out of the training examples. In some embodiments, the feature extraction module 230 may expand each of the training examples into some other form such as a sentence, question, or phrase. In some embodiments, the feature extraction module 230 may add terms or words to a training example to form a complete sentence. In other embodiment, the feature extraction module 230 may process the training examples without expanding each of the training examples into separate forms. In some embodiments, the feature extraction module 230 may determine whether the statement is a question; whether the question is asking for a name of a person, place, or thing; whether the question is asking for a number such as how many, a phone number, or a temperature; or whether the question is asking for an address, directions, instructions, etc.

In one embodiment, the data generated by the feature extraction module 230 using the training examples is then inputted into the semantic analysis model training module 240. The semantic analysis model training module 240 is configured to build a semantic analysis model based on the input data. A semantic analysis model is a statistical model that is used to estimate the relative likelihood of different phrases (i.e., determine a probability that a given input sequence matches a predetermined phrase or user defined intent category). In certain embodiments, the semantic analysis model may include statistical matches of certain sounds to word sequences. In some embodiments, the semantic analysis model may also provide context statistical analysis for distinguishing between words and phrases that sound similar. In various embodiments, the semantic analysis model may be stochastic and/or grammatical. The semantic analysis model may be stored locally or remotely in one or more semantic analysis model database 242. In various embodiments, each training example is a pair consisting of an input object and a desired output value. A supervised learning algorithm analyzes the training data and produces a semantic analysis model, which can be used for mapping new examples or an unknown lexical sequence. For example, in some embodiments, the semantic analysis model pairs output values or labels from the training examples with input feature combinations. An optimal scenario will allow for the semantic analysis model to be used to correctly determine the class labels for unseen instances.

In one embodiment, the user input processing module 250 is configured to receive a user input such as a voice command, dialog, or text input, and process the user input to determine the meaning or intent of the user input. For example, in one embodiment, the user input processing module 250 may be configured to use the created semantic analysis model to convert a voice command into plain text and determine the semantic meaning of the voice command. In certain embodiments, the user input processing module 250 may include a dialog manager for determining an output or response to the user input and generating the output or response. In certain embodiments, the user input processing module 250 may communicate with one or more external systems in determining the appropriate output or response. In certain embodiments, the dialog manager may convert the output to speech for conversing with the user.

Figure 3A:
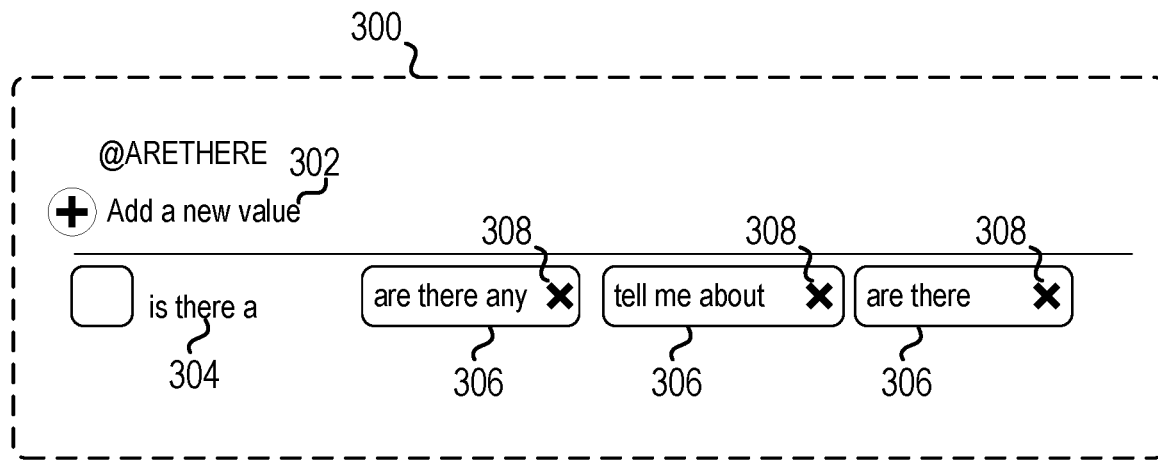
FIGS. 3A-3C are schematic diagrams illustrating the creation of proxy tags in accordance with various embodiments.
Figure 3B:
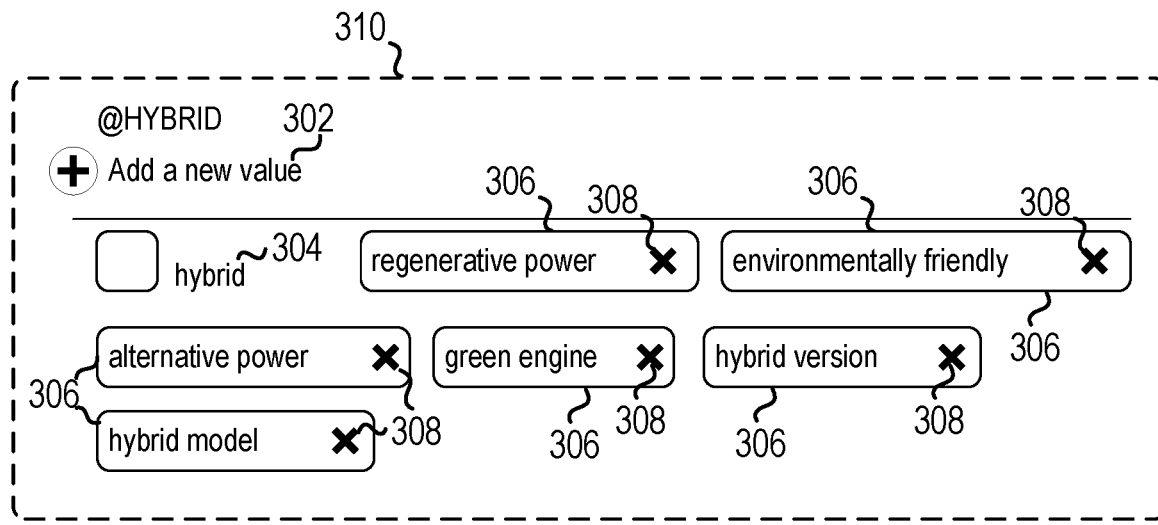
Figure 3C:
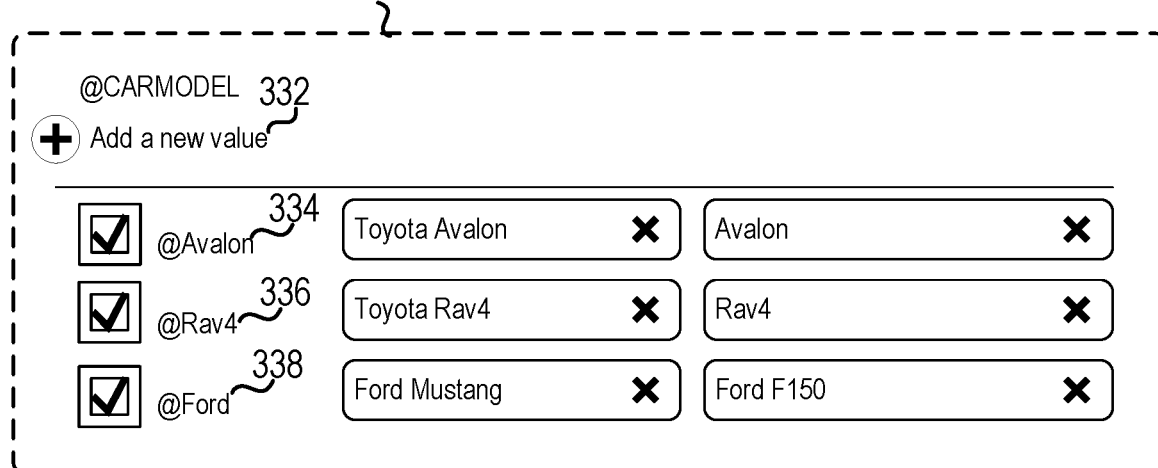

FIGS. 3A-3C are schematic diagrams illustrating the creation of proxy tags in accordance with various embodiments. The proxy tags may be created using the proxy creation module 210 and stored in the proxy tags database 212 as described in FIG. 2. FIG. 3A illustrates a user interface 300 for adding a phrasal proxy tag called @ARETHERE. FIG. 3B illustrates a user interface 310 for adding a word proxy tag called @HYBRID. In the depicted embodiments, a user may type or enter in a word or phrase at "Add a new value" 302 to the set of surface form variants associated with the proxy tag. Additionally, the user interface 300 may include predefined terms or phrases 304 that a user may select to add to the proxy tag. The user interface 300 may also depict terms or phrases 306 that have already been added to the proxy tag either manually by the user or were automatically added by the system as described above. In certain embodiments, an "X" 308 next to a term/phrase 306 may be selected to delete the term/phrase 306 from the proxy tag.

FIG. 3C illustrates a user interface 330 for adding a category proxy tag called @CARMODEL. Similar to FIGS. 3A and 3B, a user may type or enter in a word or phrase at "Add a new value" 332 to the set of surface form variants associated with the proxy tag. In this embodiment, the user interface 330 enables a user to add the set of surface form variants associated with other proxy tags. For example, in the depicted embodiment, the proxy tag @Avalon 334 may be selected to add the surface form variants Toyota® Avalon® and Avalon® to the @CARMODEL proxy tag. A similar proxy tag @Rav4 336 may be selected to add the surface form variants Toyota® Rav4® and Rav4® to the @CARMODEL proxy tag. Still, a proxy tag @FORD 338 may be selected to add various Ford® car models such as the Ford Mustang and Ford F150 surface form variants to the @CARMODEL proxy tag. Thus, FIG. 3C illustrates that a proxy tag may be built using one or more other proxy tags.

Figure 4:
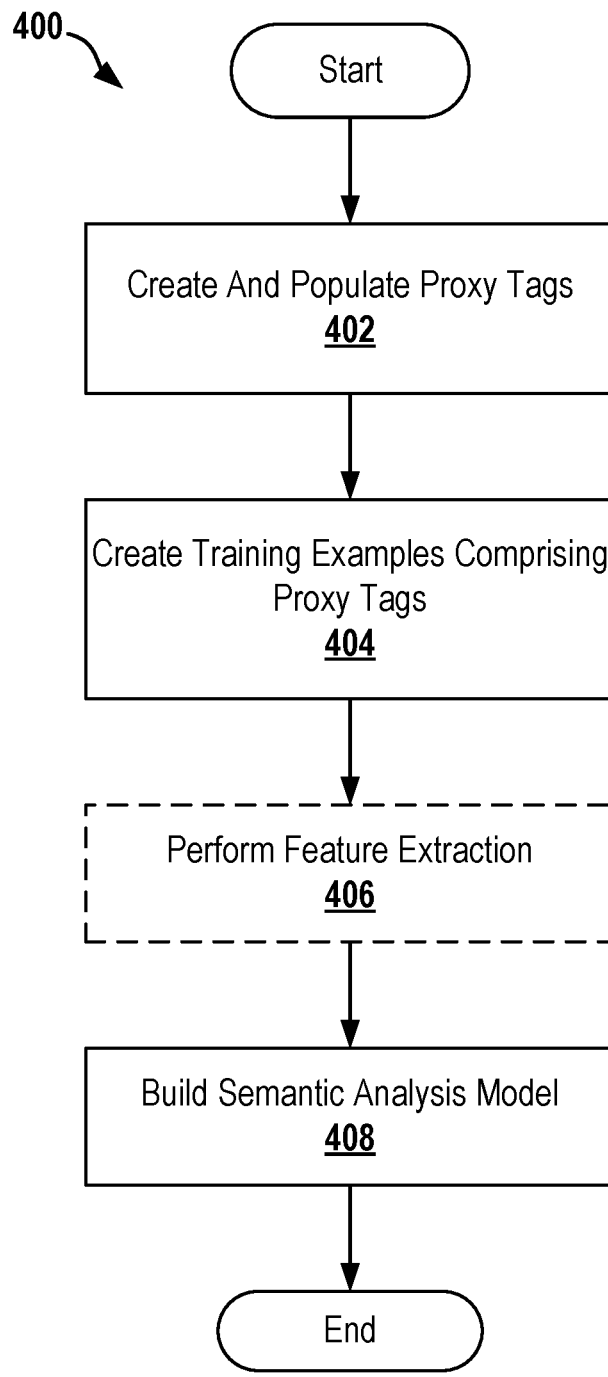
FIG. 4 is a flowchart depicting a computer-implemented method for building a semantic analysis model in accordance with various embodiments.

FIG. 4 is a flowchart depicting a computer-implemented method 400 for building a semantic analysis model in accordance with various embodiments. The computer-implemented method 400 may be performed by a natural language processing system such as natural language processing system 100. The natural language processing system may be configured to execute instructions or code corresponding to the computer-implemented method 400 using one or more processors or processing components. In the depicted embodiment, the computer-implemented method 400 begins at step 402 by creating proxy tags and populating each of the proxy tags with a set of surface form variants. In various embodiments, each proxy tag includes a name or identifier (ID) for the set of surface form variants. As stated above, the proxy tags may be user created and/or may be created automatically such as by performing text analysis or term discovery on a corpus of documents or sentences, glossaries, knowledge graphs or knowledge base, lexical databases, or other resources.

The computer-implemented method 400 at step 404 creates training examples that include one or more proxy tags. In various embodiments, the training examples include a combination of terminal tokens and proxy tags. In some embodiments, the training examples may include only proxy tags. In certain embodiments, the creation of the training examples may be automated or may be manually created by a user. In various embodiments, the training examples do not need to form complete phrases or sentences.

In various embodiments, once the training examples are created, the computer-implemented method 400 may optionally at step 406 perform feature extraction using the training examples to generate various feature extraction data as described above. For example, in certain embodiments, the feature extraction process may perform parsing, generate keywords, determine fuzzy/inexact matches (e.g., misspelled words), and perform part-of-speech tagging of the training examples. The computer-implemented method 400 at step 408 uses the training examples and or the feature extraction data to build a semantic analysis model. For example, in one embodiment, the computer-implemented method 400 may be configured to pair output labels from the training examples with feature combinations. The semantic analysis model is used to determine the statistical likelihood of different phrases matching an input phrase or to determine the best intent category of sentences matching an input phrase. In various embodiments, the semantic analysis model may also be used to determine the tone of a phrase (e.g., as positive, negative or neutral). The disclosed embodiments may be used to build a semantic analysis model in any language.

Figure 5:
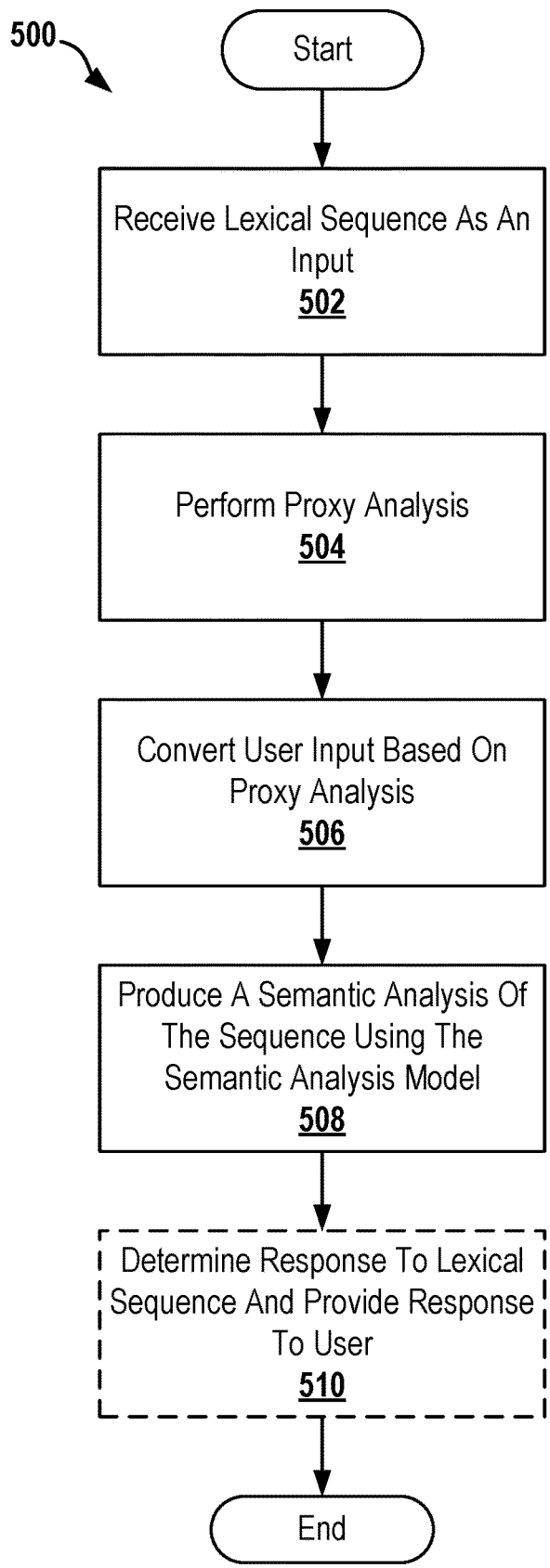
FIG. 5 is a flowchart depicting a computer-implemented method for testing the semantic analysis model in accordance with various embodiments.

FIG. 5 is a flowchart depicting a computer-implemented method 500 for testing the semantic analysis model in accordance with various embodiments. The computer-implemented method 500 may be performed by a natural language processing system such as natural language processing system 100 by executing instructions or code corresponding to the computer-implemented method 500 using one or more processors or processing components. In the depicted embodiment, the computer-implemented method 500 begins at step 502 by receiving a lexical sequence as an input. The lexical sequence may be a combination of keywords, a complete sentence, a question, or any other sequence of characters. The lexical sequence may be received as a verbal dialog, a textual input, or a combination thereof. As another optional feature, in some embodiments, the computer-implemented method 500 may be configured to receive a proxy tag as part of the lexical sequence input. For example, in some embodiments, a user may enter "What @CarModel is best rated" as a lexical sequence.

At step 504, the computer-implemented method 500 is configured to perform a proxy analysis on the lexical sequence for word sequences that are listed in the surface form variants of the proxy tags. For example, if one of the terms in the lexical sequence is Toyota®, the proxy analysis may determine that the lexical sequence might involve the proxy tag @CarModels. In various embodiments, the proxy analysis may be configured to determine inexact matches such as for misspelled versions of surface form variants or homonyms. In certain embodiments, the proxy analysis may be configured to determine the proxy tags based on the surrounding word context of the lexical sequence when the word sequences are listed in the surface form variants of more than one of the proxy tags. In one embodiment, a boolean feature for the proxy tag is set to true when the proxy analysis finds a match for a surface form variant of the proxy tag in the lexical sequence. Other forms of tracking when the proxy analysis finds a match for a surface form variant of a proxy tag in the lexical sequence may also be used in accordance with the disclosed embodiments.

In one embodiment, at step 506, the computer-implemented method 500 is configured to convert the lexical sequence based on the proxy analysis. In one embodiment, the computer-implemented method 500 converts a basic lexical sequence into a form that includes proxy tags by replacing one or more words in the lexical sequence with the proxy tags. For example, if the lexical sequence is "Do Honda Civics have a high resell value?," the computer-implemented method 500 may convert the lexical sequence into "Do @CarModel have a high resell value."

At step 508, the computer-implemented method 500 is configured to produce a semantic analysis of the lexical sequence using the semantic analysis model. For example, in one embodiment, once the lexical sequence is converted to proxy form, the computer-implemented method 500 uses the semantic analysis model and the various lexical forms associated with the proxy tags to produce a semantic analysis of the lexical sequence. In certain embodiments, the computer-implemented method 500 may generate a list of possible intent categories based on the semantic analysis model and a confidence score associated with each of the possible categories.

As an optional step 510, in some embodiments, the computer-implemented method 500 is configured to determine a response to the lexical sequence and provide the response to a user. For example, once a lexical sequence is determined, the computer-implemented method 500 may query one or more systems or databases for an answer to the lexical sequence. The computer-implemented method 500 may then convert the answer using text to speech to provide a verbal response to the user.

Figure 6:
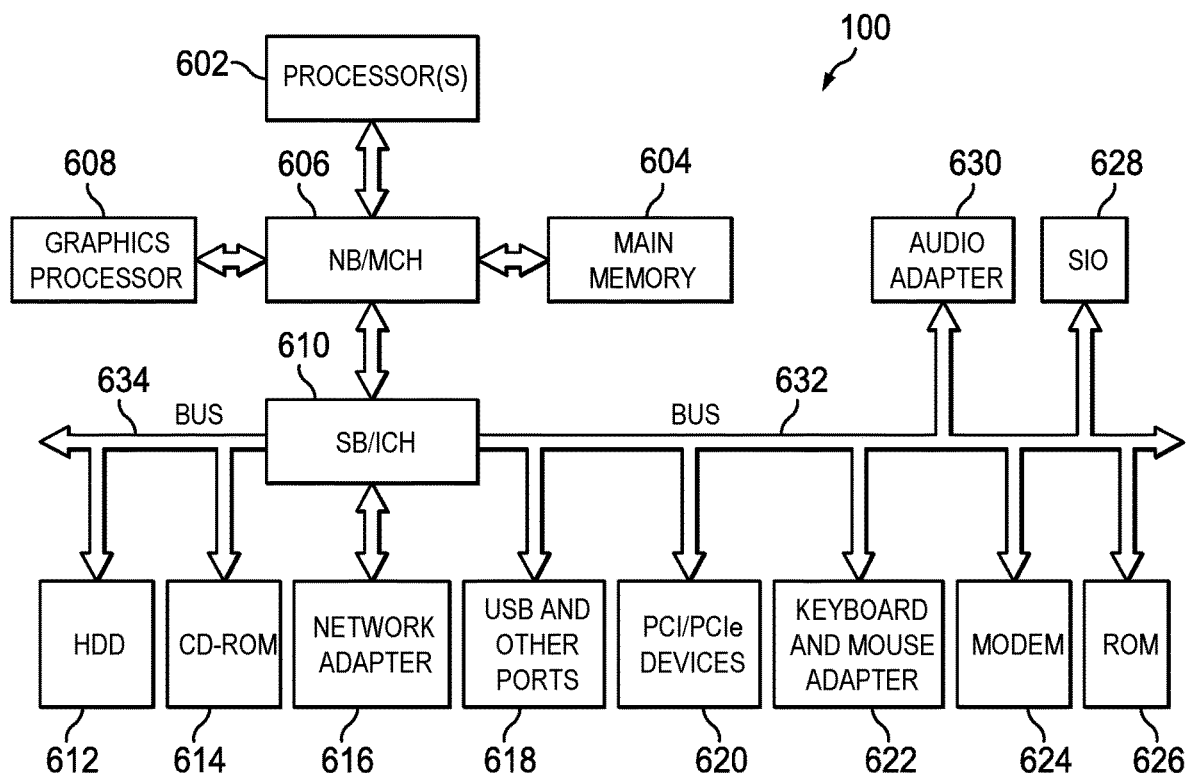
FIG. 6 is a block diagram of an example data processing system in accordance with various embodiments.

FIG. 6 is a block diagram of various hardware components of the natural language processing system 100 in accordance with an embodiment. Although FIG. 6 depicts certain basic components of the natural language processing system 100, the disclosed embodiments may also be implemented in very advanced systems such as an IBM® Power 750 servers or the IBM Watson® supercomputer, which employs a cluster of ninety IBM Power 750 servers, each of which uses a 3.5 GHz POWER7 eight-core processor, with four threads per core. Additionally, certain embodiments of the natural language processing system 100 may not include all hardware components depicted in FIG. 6. Similarly, certain embodiments of the natural language processing system 100 may include additional hardware components that are not depicted in FIG. 6.

In the depicted example, the natural language processing system 100 employs a hub architecture including north bridge and memory controller hub (NB/MCH) 606 and south bridge and input/output (I/O) controller hub (SB/ICH) 610. Processor(s) 602, main memory 604, and graphics processor 608 are connected to NB/MCH 606. Graphics processor 608 may be connected to NB/MCH 606 through an accelerated graphics port (AGP). A computer bus, such as bus 632 or bus 634, may be implemented using any type of communication fabric or architecture that provides for a transfer of data between different components or devices attached to the fabric or architecture.

In the depicted example, network adapter 616 connects to SB/ICH 610. Audio adapter 630, keyboard and mouse adapter 622, modem 624, read-only memory (ROM) 626, hard disk drive (HDD) 612, compact disk read-only memory (CD-ROM) drive 614, universal serial bus (USB) ports and other communication ports 618, and peripheral component interconnect/peripheral component interconnect express (PCI/PCIe) devices 620 connect to SB/ICH 610 through bus 632 and bus 634. PCI/PCIe devices 620 may include, for example, Ethernet adapters, add-in cards, and PC cards for notebook computers. PCI uses a card bus controller, while PCIe does not. ROM 626 may be, for example, a flash basic input/output system (BIOS). Modem 624 or network adapter 616 may be used to transmit and receive data over a network.

HDD 612 and CD-ROM drive 614 connect to SB/ICH 610 through bus 634. HDD 612 and CD-ROM drive 614 may use, for example, an integrated drive electronics (IDE) or serial advanced technology attachment (SATA) interface. Super I/O (SIO) device 628 may be connected to SB/ICH 610. In some embodiments, HDD 612 may be replaced by other forms of data storage devices including, but not limited to, solid-state drives (SSDs).

An operating system runs on processor(s) 602. The operating system coordinates and provides control of various components within the natural language processing system 100 in FIG. 6. Non-limiting examples of operating systems include the Advanced Interactive Executive (AIX®) operating system or the Linux® operating system. Various applications and services may run in conjunction with the operating system. For example, in one embodiment, International Business Machines (IBM)® DeepQA software, which is designed for information retrieval that incorporates natural language processing and machine learning, is executed on natural language processing system 100.

The natural language processing system 100 may include a single processor 602 or may include a plurality of processors 602. Additionally, processor(s) 602 may have multiple cores. For example, in one embodiment, natural language processing system 100 may employ a large number of processors 602 that include hundreds or thousands of processor cores. In some embodiments, the processors 602 may be configured to perform a set of coordinated computations in parallel.

Instructions for the operating system, applications, and other data are located on storage devices, such as one or more HDD 612, and may be loaded into main memory 604 for execution by processor(s) 602. In certain embodiments, HDD 612 may store proxy tags, training examples comprising a combination of terminal tokens and proxy tags, and a semantic analysis model that is built using the training examples. In some embodiments, additional instructions or data may be stored on one or more external devices. The processes for illustrative embodiments of the present invention may be performed by processor(s) 602 using computer usable program code, which may be located in a memory such as, for example, main memory 604, ROM 626, or in one or more peripheral devices 612 and 614.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As referenced herein, the term database or knowledge base is defined as collection of structured and/or unstructured data. Although referred in the singular form, the database may include one or more databases, and may be locally stored on a system or may be operatively coupled to a system via a local or remote network. Additionally, the processing a certain data or instructions may be performed over the network by one or more systems or servers, and the result of the processing of the data or instructions may be transmitted to a local device.

It should be apparent from the foregoing that the disclosed embodiments have significant advantages over current art. As an example, the disclosed embodiments enable training examples to be broken up into modular/swappable pieces, with no grammatical rules required to represent substitutability. Additionally, the disclosed embodiments alter the training/testing algorithms, so that equivalent variation can be recognized in the classification algorithm. Advantages of the disclosed embodiments include faster development of a semantic analysis model because the exact phrases are not required to be created or listed. Instead, a proxy tag may simply be altered. For example, if a new car model is created, the disclosed embodiments does not require that the exact phrase for every single statement or question possibly involving that car model be created as part of the training example corpus for building a semantic analysis model. Instead, the new car model may simply be inserted into one or more proxy tags associated with car models. The disclosed embodiments may then auto expand the proxy tags when building the semantic analysis model without the need for generating all possible sentences. Another advantage of the disclosed embodiments includes the possibility to quickly adapt semantic analysis models to new languages. Translating terminal word sequences in training examples only, excluding proxy tags and finally translating the content of proxy tags without the need of translating all raw training samples.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. For example, although the above disclosed embodiments are described for use with the English language, the disclosed embodiments may be employed for any language.

Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for building models for semantic analysis of natural language, the computer-implemented method comprising:
   creating proxy tags comprising a set of surface form variants;
   creating training examples comprising a combination of terminal tokens and at least one of the proxy tags; and
   training a semantic analysis model using the training examples.

2. The computer-implemented method of claim 1, wherein the set of surface form variants comprises surface form variants that are phrases.

3. The computer-implemented method of claim 1, wherein the set of surface form variants comprises surface form variants that have inconsistent structural classes.

4. The computer-implemented method of claim 1, wherein the proxy tags comprise other proxy tags.

5. The computer-implemented method of claim 1, wherein the set of surface form variants for the proxy tags are automatically populated using a lexical database.

6. The computer-implemented method of claim 1, further comprising:
 receiving a lexical sequence as an input;
 performing a proxy analysis on the lexical sequence for word sequences that are listed in the set of surface form variants of the proxy tags;
 converting the lexical sequence based on the proxy analysis; and
 producing a semantic analysis of the lexical sequence using the semantic analysis model.

7. The computer-implemented method of claim 6, wherein the proxy analysis comprises determining the proxy tags based on a surrounding word context of the lexical sequence when the word sequences are listed in the set of surface form variants of more than one of the proxy tags.

8. The computer-implemented method of claim 6, wherein converting the lexical sequence based on the proxy analysis comprises replacing words in the lexical sequence with the proxy tags.

9. A system comprising:
 a memory configured to store computer-executable instructions;
 a processor configured to execute the computer-executable instructions to:
  create proxy tags comprising a set of surface form variants;
  create training examples comprising a combination of terminal tokens and at least one of the proxy tags; and
  train a semantic analysis model using the training examples.

10. The system of claim 9, wherein the set of surface form variants comprises surface form variants that are phrases.

11. The system of claim 9, wherein the set of surface form variants comprises surface form variants that have inconsistent structural classes.

12. The system of claim 9, wherein the proxy tags comprise other proxy tags.

13. The system of claim 9, wherein the set of surface form variants for the proxy tags are automatically populated.

14. The system of claim 9, wherein the processor is further configured to execute the computer-executable instructions to:
 receive a lexical sequence as an input;
 perform a proxy analysis on the lexical sequence for word sequences that are listed in the set of surface form variants of the proxy tags;
 convert the lexical sequence based on the proxy analysis; and
 produce a semantic analysis of the lexical sequence using the semantic analysis model.

15. The system of claim 14, wherein the processor is further configured to execute the computer-executable instructions to determine a confidence score for the semantic analysis of the lexical sequence using the semantic analysis model.

16. A computer program product for building a semantic analysis model, the computer program product comprising a non-transitory computer readable storage medium having program instructions embodied therewith, the program instructions executable by a processor of a system to cause the system to:
 create proxy tags comprising a set of surface form variants;
 create training examples comprising a combination of terminal tokens and at least one of the proxy tags; and
 train the semantic analysis model using the training examples.

17. The computer program product of claim 16, wherein the set of surface form variants comprises surface form variants that are phrases.

18. The computer program product of claim 16, wherein the set of surface form variants comprises surface form variants that have inconsistent structural classes.

19. The computer program product of claim 16, wherein the proxy tags comprise other proxy tags.

20. The computer program product of claim 16, wherein the set of surface form variants for the proxy tags are automatically populated.

21. A computer-implemented method for building and testing models for semantic analysis of natural language, the computer-implemented method comprising:
 creating proxy tags comprising a set of surface form variants;
 creating training examples comprising a combination of terminal tokens and at least one of the proxy tags; and
 performing feature extraction using the training examples to extract features of the training examples; and
 training a semantic analysis model that uses the features of the training examples as input data.

22. The computer-implemented method of claim 21, wherein the semantic analysis model pairs output labels from the training examples with feature combinations for producing a semantic analysis of an unknown lexical sequence.

23. The computer-implemented method of claim 22, further comprising determining a confidence score for the semantic analysis of the unknown lexical sequence using the semantic analysis model.

24. The computer-implemented method of claim 23, further comprising performing a proxy analysis on the unknown lexical sequence for word sequences that are listed in the set of surface form variants of the proxy tags.

25. A computer-implemented method for building models for semantic analysis of natural language, the computer-implemented method comprising:
 creating proxy tags comprising a set of surface form variants;
 creating training examples comprising at least one of the proxy tags; and
 training a semantic analysis model using the training examples.

* * * * *